United States Patent [19]

Burlet et al.

[11] Patent Number: 5,102,594
[45] Date of Patent: Apr. 7, 1992

[54] PROCESS FOR THE PROCESSING OF A THERMOPLASTIC POLYCONDENSATION POLYMER

[75] Inventors: Rudolf J. H. Burlet, Geleen; Jozef M. H. Lemmens, Landgraaf, both of Netherlands

[73] Assignee: Stamicarbon B.V., Geleen, Netherlands

[21] Appl. No.: 637,258

[22] Filed: Jan. 10, 1990

Related U.S. Application Data

[63] Continuation-in-part of Ser. No. 334,625, Apr. 7, 1989, abandoned.

[30] Foreign Application Priority Data

Apr. 8, 1988 [NL] Netherlands ............ 8800904

[51] Int. Cl.⁵ .............................................. B29C 47/76
[52] U.S. Cl. ........................................ 264/101; 159/2.3; 264/37; 264/236; 264/347; 264/211.24; 264/DIG. 69; 425/203; 425/204; 425/205
[58] Field of Search ............... 264/102, 101, 37, 236, 264/347, 211.24, DIG. 69; 425/203, 204, 205; 159/2.3

[56] References Cited

U.S. PATENT DOCUMENTS

| | | | |
|---|---|---|---|
| 3,446,772 | 5/1969 | Forster et al. | 159/2.2 |
| 3,654,231 | 4/1972 | Brozek | 264/211.24 |
| 3,657,195 | 4/1972 | Doerfel et al. | 425/203 |
| 4,474,473 | 10/1984 | Higuchi et al. | 425/209 |
| 4,902,455 | 2/1990 | Wobbe | 264/102 |

FOREIGN PATENT DOCUMENTS

| | | | |
|---|---|---|---|
| 231029A | 12/1985 | Fed. Rep. of Germany | 425/203 |
| 52-27656 | 7/1977 | Japan | 264/102 |
| 2076728A | 12/1981 | United Kingdom | 264/37 |

OTHER PUBLICATIONS

Kunststof en Rubber, vol. 36, No. 9, Sep. 1983, pp. 47–48, Schiedam, NL.

*Primary Examiner*—Jeffrey Thurlow
*Attorney, Agent, or Firm*—Cushman, Darby & Cushman

[57] ABSTRACT

The invention relates to a process for the processing of a thermoplastic polycondensation polymer by supplying the polymer in finely distributed form to a first vented extruder in which the polymer is devolatilized at a temperature below its melting temperature. The polymer is then placed in a second extruder where the polymer is transported below the melting temperature of the polymer over a first length of the screw from the inlet of the extruder, with constant evacuation of volatile components by means of a vacuum exhausting device at a vacuum of less than 10 mbar and the polymer is compressed and melted over a second length of the screw and then leaves the extruder as an end product of a semimanufacture.

10 Claims, 2 Drawing Sheets

PROCESS FOR THE PROCESSING OF A THERMOPLASTIC POLYCONDENSATION POLYMER

This is a continuation in part of application Ser. No. 07/334,625 filed Apr. 7, 1989 now abandoned.

The invention relates to a process for the processing of a thermoplastic polycondensation polymer by supplying the polymer in finely distributed form to a vented extruder in which the polymer is devolatilized and melted, which process includes postcondensation of the polymer.

Such a process is known from the German Offenlegungsschrift No. 2 942 248.

Since they contain water, thermoplastic polycondensation polymers, such as for instance polyesters and polyamides, present the drawback that during the processing of this type of polymers the viscosity declines, resulting in deterioration of the mechanical and physical properties of the polymer. This is due to the circumstance that during the processing of thermoplastic polycondensation polymers, the presence of water, for instance absorbed from the ambient air, shorter molecule chains are formed, which affects the viscosity of the polymer.

If such polymers are to be used for the manufacture of end products or semimanufactures, care has to be taken that the polymer possesses sufficient viscosity.

As already stated above, from DE-A-2,942,248 a process is known for the processing of thermoplastic polycondensation polymers, involving devolatilization of the polymer during the process. In the process according to this DE-A-2,942,248 waste polyester, such as polyethylene terephthalate, abbreviated to 'PETP' in the following, is cut up and by means of a satellite compressed to an apparent volumetric density of at least 500 kg/m$^3$, preferably 600 kg/m$^3$. Next, the compressed PETP is supplied to a vented twin-screw extruder in which it is melted, while water vapour and/or other volatile components are evacuated. The melted polymer leaving the extruder is subjected, depending on the desired purity, to one or more filtrations and subsequently supplied to an autoclave, in which at reduced pressure an after-condensation in a liquid medium takes place. The purpose of this after-condensation (or post-condensation) is to increase the viscosity of the polyester to a level which is sufficiently high for the recycled polymer to be processed to end products, semimanufactures or starting material.

After the devolatilization of the polymer in the extruder in this process, a separate additional step is required, namely increasing the viscosity of the polymer to a sufficiently high level in an autoclave, after which after-condensation is effected.

The objective of the present invention is to provide a process for the processing of a thermoplastic polycondensation polymer in which after-condensation in a separate autoclave is not required and in which the material supplied to the extruder can be immediately converted to final product or semimanufacture.

According to the invention this is achieved due to the finely distributed thermoplastic polycondensation polymer to be processed being transported below the melting temperature of the polymer over a considerable length of the screw from the inlet of the extruder, with constant evacuation of volatile components by means of a vacuum exhausting device at a vacuum of less than 10 mbar and due to the polymer being compressed and melted over the remaining length of the screw and then leaving the extruder as an end product or a semimanufacture.

In this manner it is achieved that the polymer is devolatilized (and consequently dried) as long as possible in the extruder, with the circumstances, such as time, temperature and pressure, being chosen such that polycondensation can occur in the solid phase, after which the material is melted relatively fast with a view to plastic moulding.

In the process according to the invention, use is preferably made of a first and a second vented extruder, within the first extruder the polymer being transported below the melting temperature of the polymer, with constant evacuation of volatile components at a vacuum of less than 10 mbar, the polymer subsequently being supplied to the second extruder, in which the polymer is transported over a considerable length of the screw, also with constant evacuation of volatile components at a vacuum of less than 10 mbar, the polymer being compressed and melted over the remaining length of the screw of the second extruder and then leaving the second extruder as an end product or a semimanufacture.

In the process according to the invention the total length of the screw path is 20–45 times the diameter, preferably larger than 25 times the diameter. The length of the remaining part of the screw where the polymer is compressed and melted in the extruder is equal to 1–10 d; preferably 2–6 d; in particular 3–4 d. By overall screw length when using a first and a second extruder is understood the sum of the screw lengths of the first and the second extruder. If a single extruder is used this is of course the length of the screw of this extruder.

In the extruder a vacuum is maintained of less than 10 mbar, preferably less than 5 mbar.

The process according to the invention is in particular suitable for processing of polyethylene terephthalate. This may also be waste PETP, such as PETP bottle material or fibers. This kind of bottles has been increasingly used in the past few years for carbonated drinks. Especially for environmental as well as economic considerations, recycling of PETP bottles has become of growing importance in recent years. With the process according to the present invention this can be done simply and efficiently.

In applying the process according to the invention, use can be made of a first interposed extruder with a high vacuum in which the temperature is set such that the polymer does not melt and released moisture is evaporated and evacuated, after which the polymer is supplied to a second extruder. This interposed extruder can be regarded as a vented screw conveyor. In this manner drying and homogenization of the polymer is effected before it is supplied to the second extruder under the best possible conditions. Besides moisture which is evaporated and evacuated, volatile substances released, such as acetaldehyde, additives, emulsifiers, etc., will be evacuated.

In the process according to the invention, predrying of the polymer to be processed prior to supplying it to the extruder is not necessary because devolatilization can be continued longer, so that there is more time for postcondensation in the extruder. For non-predried PETP, longer devolatilization is required in order to obtain a good end product.

By preference the first extruder is designed as a vented twin-screw extruder, in which postcondensation and drying of the polymer take place.

The use of a first and a second extruder, and even for instance a third one, is based on practical grounds. If only one extruder were used it would have to be very long in order to obtain a good end product. This would entail problems with respect to the supporting required to prevent deflection of the long screw. Moreover, driving of one long extruder is more problematic than in the case of two or more extruders of which the combined screw length is equal to that of one long extruder. Another advantage of the use of several extruders is that the extruders can be driven independently of each other. It is thus possible for instance to have the screw of the first extruder rotate faster than that of the second extruder, which facilitates transferring the polymer from the first to the second extruder.

The process according to the invention is preferably used with polymers having a particle size lower than 2000 μm. It has appeared that good to very good results are obtained starting at this level. The results even improve with lower particle sizes.

BRIEF DESCRIPTION OF THE DRAWINGS

The invention, with utilization of a first and a second extruder, will be further elucidated with reference to FIGS. 1 and 2.

One embodiment of the present invention is shown in FIG. 1. Via the line 1 finely distributed PETP waste material, for instance from bottles for carbonated drinks, is pneumatically or mechanically supplied to the closed hopper 2 and via a vacuum lock into the vacuum chamber 4, in which an optionally set underpressure prevails. The extruder 5 is a vented twin-screw extruder. During take-up of material by the extruder 5 from the vacuum chamber 4 the hopper 2 takes in new starting material (non-predried finely distributed PETP) and the hopper 2 is drawn vacuum and discharged into vacuum chamber 4 via the vacuum lock 3. The extruder 5 is set to such a temperature that the material does not melt and any moisture present is evaporated and evacuated. In this manner the material is dried and homogenized before it is supplied to the second extruder 7 via the line 6. In the extruder 7 devolatilization takes place as long as possible in the various zones below the melting point of PETP. The PETP material is compressed on the remaining part of the screw and brought into the melting phase. In the drawing this part is indicated by a. The remaining part of the screw is equal to about 3-4 times the diameter, the total screw length being 25 times the diameter. With longer extruders this distance may be greater, for instance 10 D in the case of a screw length of 42 D.

The evacuation of vapours and volatile substances from the system is effected by means of a vacuum system of less than 10 mbar and comprising one or more vacuum pumps (not represented), the lines 8, 9 and 10 and the shutoff valves 11 and 12. The polymer leaving the second extruder 7 is processed into products, such as sheeting, or into semimanufactures or starting material, such as granulate.

EXAMPLE I

Table A shows the measurement results for various samples that were tested under varying conditions.

Sample 5 was tested under the conditions according to the present invention.

After a period of postcondensation and short, rapid melting in the head of the extruder 7 an intrinsic viscosity (I.V.) of 0.734 was ultimately reached. Due to sufficient pressure decrease during the extrusion in the first and the second extruder, as well as correct setting of the temperature in the first and the second extruder, good devolatilization of the material was obtained. The different combinations gave increasingly good results, as appeared from the intrinsic viscosity of the various samples.

TABLE A

| Sample (hour time) | Temp. °C 1st extr. | 2nd extruder 1 | 2 | 3 | head | Yield/rpm kg/h min$^{-1}$ | Underpressure mbar | I.V. | Remarks |
|---|---|---|---|---|---|---|---|---|---|
| 1 | 60 | 280 | 280 | 280 | 270 | 30/20 | 40 | 0.636 | ° Start after vacuum drawing |
| 2 | 100 | 280 | 280 | 280 | 270 | 30/20 | 40 | 0.646 | ° Temp. increase of agglom. Better devolatization |
| 3 | 155 | 200 | 280 | 280 | 270 | 71/20 | 22 | 0.694 | ° Temp. increase of agglom. (better devolatization)<br>° 1st zone lowered, longest possible devolatization of material without entering the melting phase<br>° Underpressure higher (from 40 to 22 mbar); better devolatization |
| 4 | 200 | 200 | 230 | 280 | 270 | 71/20 | 22 | 0.710 | ° Temp. increase of agglom.<br>° 2nd zone lowered, longest possible devolatization of material<br>° Short melting time |
| 5 | 200 | 200 | 230 | 280 | 270 | 71/20 | 3 | 0.734 | ° Pressure decrease with extra pump; much better devolatization<br>° Longer extruder gives more homogeneous end product |

I.V. of starting material is 0.71

EXAMPLE II

Under the conditions as indicated for sample 5 in Example I the effect of the particle size was ascertained. Table B gives the results obtained with non-predried particles, table C those obtained with particles that were dried at 160° C. for 6 hours.

TABLE B

| Sample | Particle size | I.V. |
|---|---|---|
| 5 | 3 mm | 0.615 |
| 6 | 1 mm | 0.714 |
| 7 | 0.5 mm | 0.740 |

TABLE C

| Sample | Particle size | I.V. |
|---|---|---|
| 8 | 3 mm | 0.765 |
| 9 | 3 mm | 0.774 |
| 10 | 0.5 mm | 0.782 |

TABLE C-continued

| Sample | Particle size | I.V. |
|---|---|---|
| 11 | 0.5 mm | 0.780 |
| 12 | 1 mm | 0.780 |
| 13 | 1 mm | 0.765 |
| 14 | 1 mm | 0.780 |

EXAMPLE III

Figure 1:
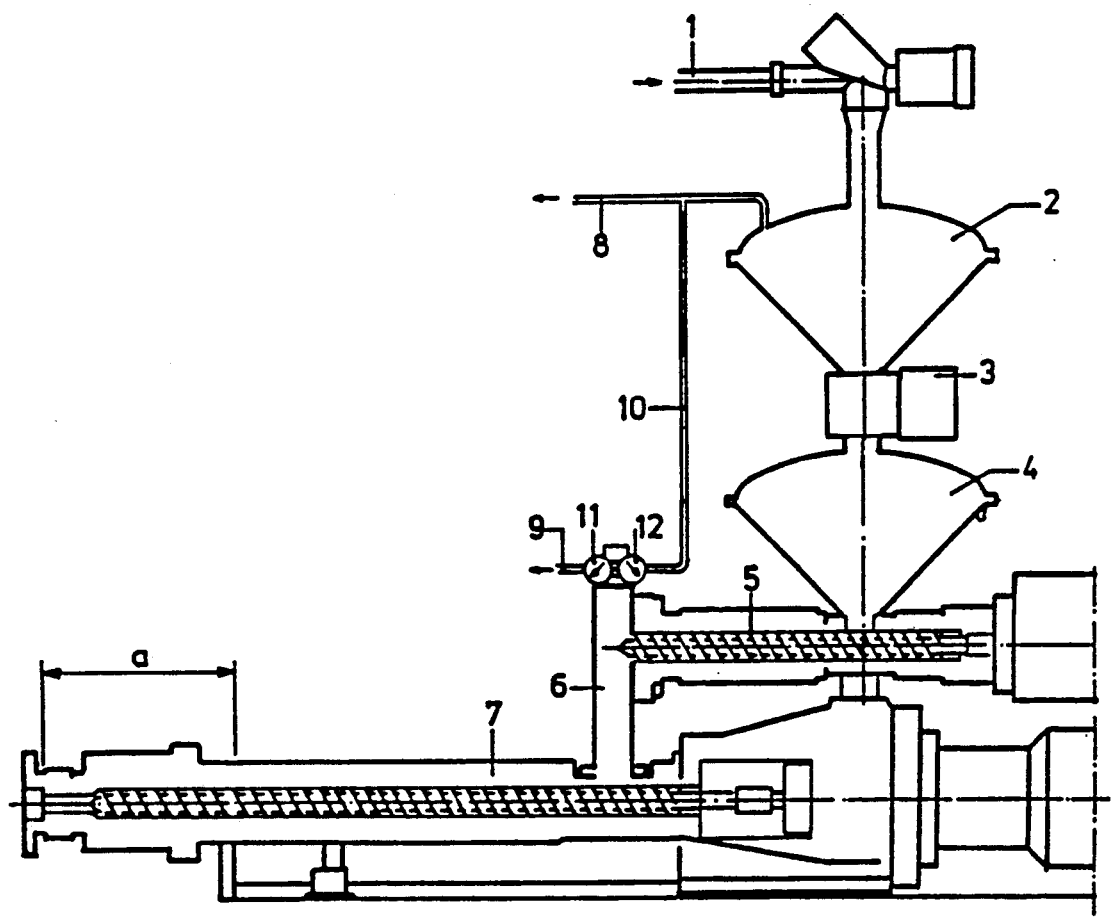
Figure 2:
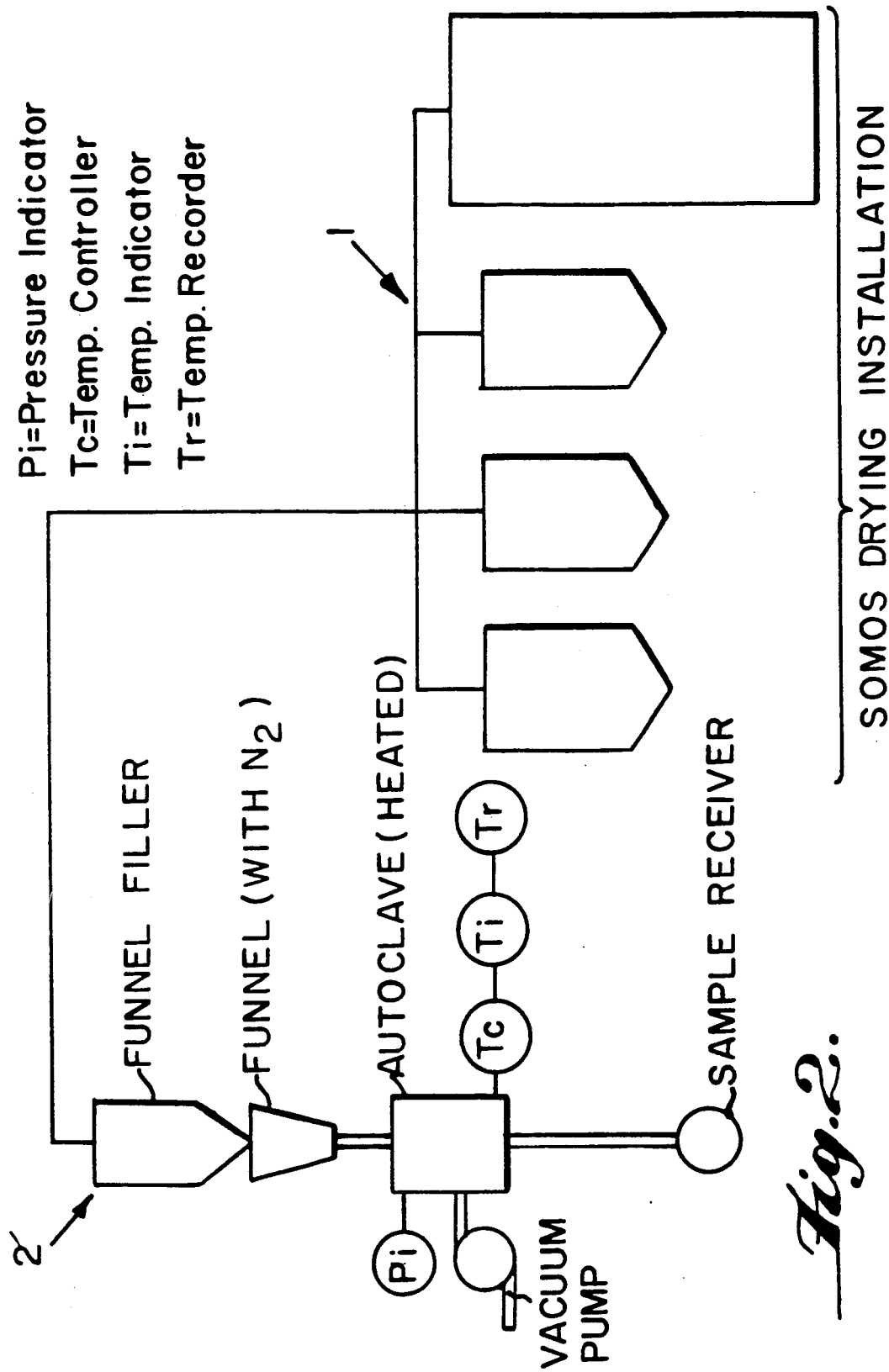

Another embodiment of the present invention is depicted in FIG. 2. The two-step processing equipment comprises a pre-drying device 1 and a final drying device 2, which simulates an extruder with a heated autoclave.

Results achieved with this embodiment are presented in Table D. In order to obtain temperatures of 230° C., the wall temperature of the autoclave must be elevated. Therefore, thermal degradation of the polymer can occur, especially in those particles which are close to the wall.

From these experimental results, it is evident that the longer the particles are dried under vacuum conditions, and the smaller the particles are, the better the end-product will be.

TABLE D

| Granule size | without pre-drying initial humidity content 0.35% | | | with pre-drying 6 h 160° C. initial humidity content <0.005% | |
|---|---|---|---|---|---|
| | pressure time temperature | I.V. | | | |
| 3 mm | 3 mbar 6 minutes 230° C. | 0.615 | | 3 mbar 6 minutes 230° C. | 0.765 |
| 3 mm | | | | 3 mbar 20 minutes 230° C. | 0.774 |
| 1000 um | 3 mbar 6 minutes 230° C. | 0.714 | | 3 mbar 6 minutes 230° C. | 0.780 |
| 1000 um | | | | 100 mbar 6 minutes 230° C. | 0.765 |
| 1000 um | | | | 3 mbar 20 minutes 230° C. | 0.780 |
| 500 um | 3 mbar 6 minutes 230° C. | 0.740 | | 3 mbar 6 minutes 230° C. | 0.792 |
| 500 um | | | | 3 mbar 20 minutes 230° C. | 0.780 |

We claim:

1. A process for the processing of a thermoplastic polycondensation polymer, said process comprising:
   (a) supplying polymer particles with a size of less than 2,000 μm to a first vented extruder in which said polymer is devolatilized and homogenized by means of transporting said polymer through said extruder at a temperature below the melting temperature of said polymer with constant evacuation of volatile components at a vacuum of less than 10 mbar;
   (b) supplying said polymer to a second vented extruder in which said polymer is devolatilized by means of transporting said polymer over a first length of a screw at a temperature below the melting temperature of said polymer with constant evacuation of volatile components at a vacuum of less than 10 mbar; and
   (c) compressing and melting said polymer over a second length of said screw of said second extruder, with said polymer exiting said second extruder as an end product or semi-manufacture,
   wherein, said second screw length of said second extruder is equal to 1-10 times the diameter and wherein the total length of said first and second extruders screw path is equal to 20-45 times the diameter.

2. Process according to claim 1, characterized in that the total length of the screw path is larger than 25 times the diameter.

3. Process according to claim 1, characterized in that the remaining part of the screw length on which the polymer is compressed and melted is equal to 2 to 6 times the diameter of the screw.

4. Process according to claim 1, characterized in that the remaining part of the screw length on which the polymer is compressed and melted is equal to 3 to 4 times the diameter of the screw.

5. Process according to claim 1, characterized in that the constant evacuation of volatile components takes place at a vacuum of less than 5 mbar.

6. Process according to claim 1, characterized in that a twin-screw extruder is used as vented extruder.

7. Process according to claim 1, characterized in that the thermoplastic polycondensation polymer is polyethylene terephthalate.

8. Process according to claim 1, characterized in that the thermoplastic polycondensation polymer is obtained from waste polyethylene terephthalate bottles that have been comminuted.

9. Process according to claim 1, characterized in that the particle size is less than 1000 μm.

10. Process according to claim 1, characterized in that the particle size is less than 500 μm.

* * * * *